United States Patent
Koga et al.

(10) Patent No.: US 7,482,728 B2
(45) Date of Patent: Jan. 27, 2009

(54) ELECTROSTATIC ACTUATOR INCLUDING A SWITCHING CIRCUIT WHICH SELECTIVELY SETS ONE OF A MOVING MODE AND FIRST AND SECOND HOLDING MODES AND DRIVING METHOD THEREFOR

(75) Inventors: Akihiro Koga, Kawasaki (JP);
Masayuki Sekimura, Chofu (JP);
Toshikatsu Akiba, Kisarazu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 483 days.

(21) Appl. No.: 11/233,091

(22) Filed: Sep. 23, 2005

(65) Prior Publication Data
US 2006/0097672 A1   May 11, 2006

(30) Foreign Application Priority Data
Nov. 8, 2004   (JP)   ............................. 2004-324389

(51) Int. Cl.
*H02N 1/00*   (2006.01)
*G02B 7/04*   (2006.01)
*G02B 7/08*   (2006.01)

(52) U.S. Cl. .................. 310/309; 348/357; 396/75; 318/116

(58) Field of Classification Search .................. 310/309; 318/116; 396/75, 133, 661, 439; 348/374
See application file for complete search history.

(56) References Cited

U.S. PATENT DOCUMENTS

| 6,611,079 | B2 | 8/2003 | Koga et al. |
| 6,670,738 | B2 | 12/2003 | Kasahara et al. |
| 6,680,558 | B2 | 1/2004 | Akiba et al. |
| 6,717,326 | B2 | 4/2004 | Koga et al. |
| 6,750,591 | B2 | 6/2004 | Akiba et al. |

(Continued)

FOREIGN PATENT DOCUMENTS

JP   2001-346385   12/2001

(Continued)

OTHER PUBLICATIONS

U.S. Appl. No. 10/299,662, filed Nov. 20, 2002, Akihiro Koga, et al.

(Continued)

*Primary Examiner*—Karl I Tamai
(74) *Attorney, Agent, or Firm*—Oblon, Spivak, McClelland, Maier & Neustadt, P.C.

(57) ABSTRACT

The present invention provides an electrostatic actuator having a small power consumption and also provides a driving method thereof. The electrostatic actuator comprises first and second substrates having first and second stator electrodes formed thereon, respectively, and a movable section arranged between the first and second stator electrodes. The movable section has first and second surfaces that are positioned to face the first and second stator electrodes, respectively. In first and second moving modes, the movable section is slightly moved between the first and second substrates in response to the signal voltage from the driving circuit. Also, in the holding mode, the movable section is held by one of the first and second stator electrodes and, under this condition, at least one of the stator electrode holding the movable section and the movable section held by the stator electrode is left electrically floating.

8 Claims, 8 Drawing Sheets

U.S. PATENT DOCUMENTS

| | | | |
|---|---|---|---|
| 6,765,332 B2 | 7/2004 | Akiba | |
| 6,774,534 B2 | 8/2004 | Akiba et al. | |
| 6,781,281 B2 | 8/2004 | Koga et al. | |
| 6,784,594 B2 | 8/2004 | Kasahara et al. | |
| 6,806,618 B2 | 10/2004 | Koga et al. | |
| 6,806,661 B2 | 10/2004 | Kasahara et al. | |
| 6,924,940 B2 | 8/2005 | Koga et al. | |
| 7,095,565 B2 * | 8/2006 | Koga et al. | 359/694 |
| 2004/0119870 A1 | 6/2004 | Yoshida et al. | |
| 2004/0130639 A1 | 7/2004 | Koga et al. | |
| 2006/0055282 A1 | 3/2006 | Sekimura | |
| 2006/0066174 A1 * | 3/2006 | Akiba et al. | 310/309 |
| 2006/0066959 A1 * | 3/2006 | Koga et al. | 359/694 |
| 2006/0097672 A1 * | 5/2006 | Koga et al. | 318/116 |
| 2006/0209427 A1 * | 9/2006 | Akiba et al. | 359/694 |
| 2008/0218626 A1 | 9/2008 | Koga et al. | |

FOREIGN PATENT DOCUMENTS

| | | |
|---|---|---|
| JP | 2002-199747 | 7/2002 |
| JP | 2003-9550 | 1/2003 |
| JP | 2003-164167 | 6/2003 |
| JP | 2004-160572 | 6/2004 |

OTHER PUBLICATIONS

Akihiro Koga, et al., "Electrostatic Linear Microactuator Mechanism For Focusing a CCD Camera", Reprinted from IEEE Journal of Lightwave Technology, vol. 17, No. 1, Jan. 1999, pp. 43-47 and 2 cover pages.

* cited by examiner

| Signal_In | Pos_Control | Vout | TR1 | TR2 |
|---|---|---|---|---|
| High | High | Low(GND) | Open | Close |
| High | Low | Floating | Open | Open |
| Low | High | High(150V) | Close | Open |
| Low | Low | High(150V) | Close | Open |

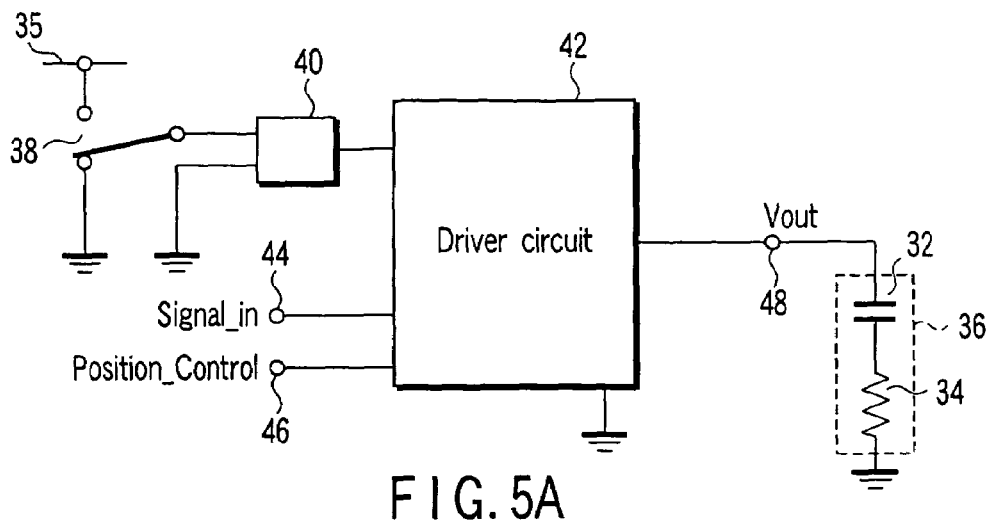
F I G. 5A
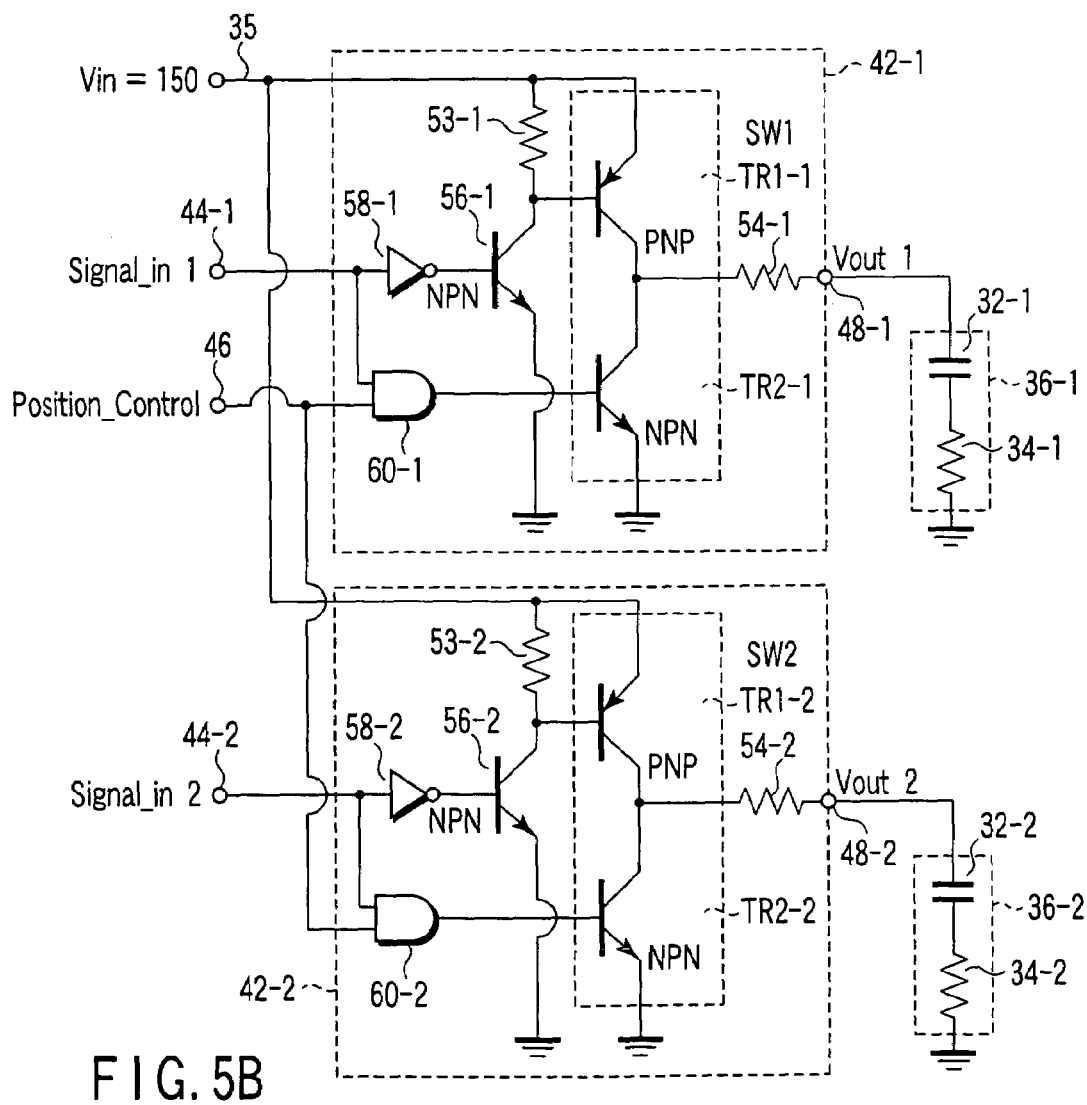
F I G. 5B

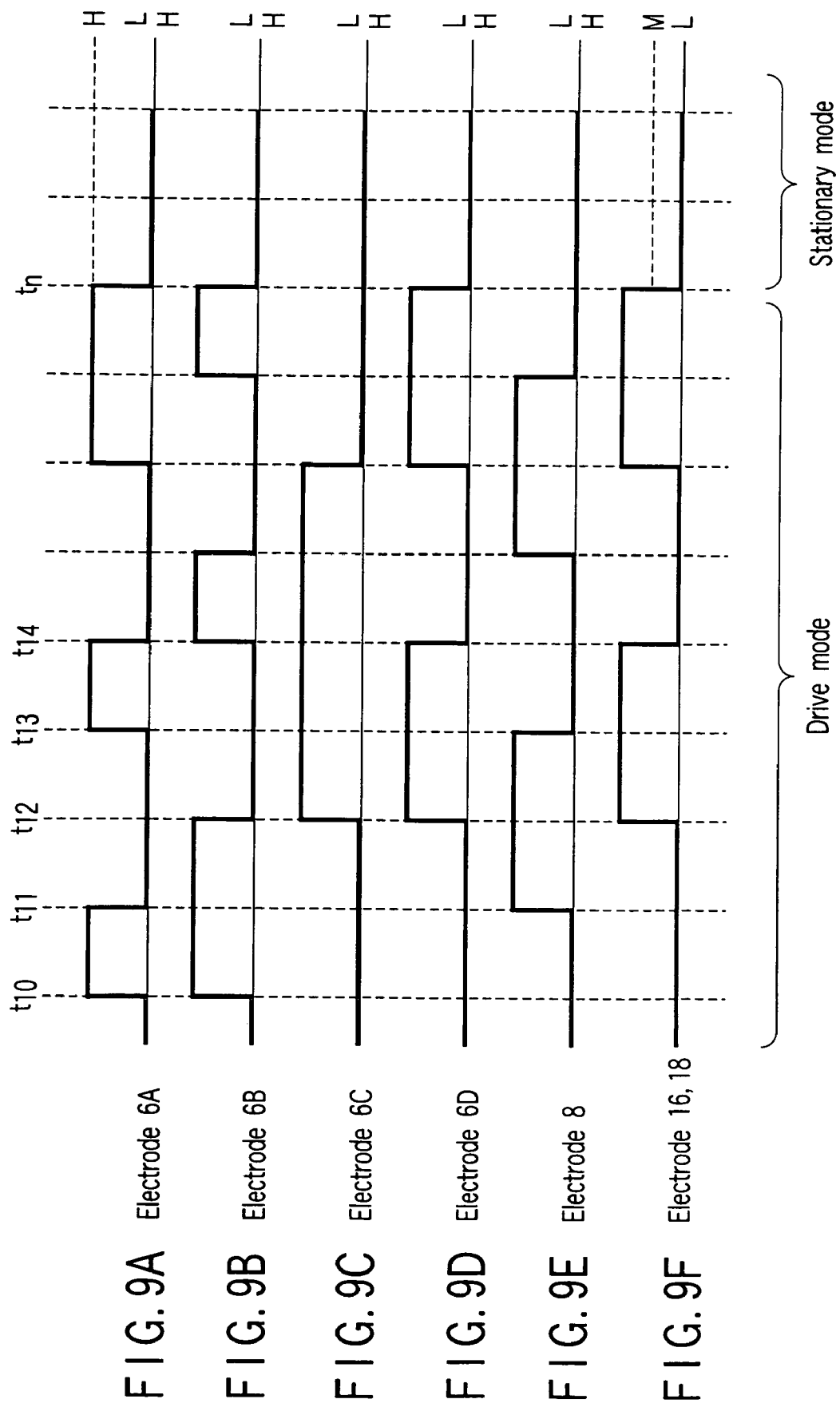

ELECTROSTATIC ACTUATOR INCLUDING A SWITCHING CIRCUIT WHICH SELECTIVELY SETS ONE OF A MOVING MODE AND FIRST AND SECOND HOLDING MODES AND DRIVING METHOD THEREFOR

CROSS-REFERENCE TO RELATED APPLICATIONS

This application is based upon and claims the benefit of priority from prior Japanese Patent Application No. 2004-324389, filed Nov. 8, 2004, the entire contents of which are incorporated herein by reference.

BACKGROUND OF THE INVENTION

1. Field of the Invention

The present invention relates to an electrostatic actuator and a driving method thereof, particularly, to an electrostatic actuator of a small power consumption and a driving method thereof.

2. Description of the Related Art

An electrostatic actuator in which a movable section is vertically driven by the electrostatic force is disclosed in, for example, Japanese Patent Disclosure (Kokai) No. 2001-346385, Japanese Patent Disclosure No. 2002-199747, Japanese Patent Disclosure No. 2003-9550 and Japanese Patent Disclosure No. 2003-164167. As disclosed in these patent documents, the electrostatic actuator is constructed such that a movable section equipped with a movable electrode is arranged between a pair of stator electrodes, and the movable section is vibrated in the vertical direction by controlling the voltage applied to the stator electrodes and the movable electrode. Also, at least one of the stator electrodes is formed of a plurality of segment electrodes that are electrically separated. In the construction in which the segment electrodes are arranged in the moving direction of the movable section, the movable section can be moved slightly by sequentially shifting the voltage applied to the segment electrodes. To be more specific, in the electrostatic actuator comprising a plurality of segment electrodes, the movable section is displaced forward or backward while being vibrated in the vertical direction when the movable section is directed toward the segment electrodes. Therefore, the movable section is moved forward or backward depending on the shift direction of the voltage applied to the segment electrodes.

The electrostatic actuator can be miniaturized by fine processing so as to make it possible to move slightly the movable section and, thus, is said to be utilized in various fields. For example, where an electrostatic actuator is mounted to a photographing apparatus such that a photographing lens is mounted to the movable section, it is possible to form a lens system capable of zooming. Also, in the electrostatic actuator that is simply vibrated in the vertical direction, it is possible to mount a photographing CCD to the movable section such that the movable section is moved in the vertical direction in accordance with the external vibration so as to realize a mechanism for counteracting the effect of hand vibration in a camera apparatus.

The electrostatic actuator itself has a low power consumption and the movable section can be driven with a low power consumption. In this electrostatic actuator, it is necessary for the movable section to be attached to one of the stator sections in order to prevent the movable section from being operated. To be more specific, the movable section itself is slightly movable between a pair of stator sections. Therefore, if the stator electrode and the movable electrode are connected to the ground potential during the holding mode in which the apparatus is under the inoperative state, the movable section is moved between the stator sections by the external force or by the own weight, with the result that it is possible for the movable section to be brought into contact inadvertently with the stator section so as to break the movable section or the stator electrode. In order to prevent the movable section from being moved freely under the inoperative state, a voltage is applied between the movable section and one of the stator electrodes so as to permit the movable section to be kept attached to the stator electrode and, thus, the movable section is made immovable. Even under the inoperative state, a voltage is required to be applied intermittently between the movable section and the one of the stator electrodes. What should be noted is that, even if the electrostatic actuator can be driven with small power consumption in the driving stage, a problem arises that the power is consumed in the inoperative stage, though the power consumption is small. It follows that the conventional electrostatic actuator is substantially incapable of realizing a driving apparatus of a small power consumption so as to give rise to the problem that the battery life of the miniaturized apparatus is shortened.

BRIEF SUMMARY OF THE INVENTION

An object of the present invention is to provide an electrostatic actuator having small power consumption and a driving method of the electrostatic actuator.

According to an aspect of the present invention, there is provided an electrostatic actuator, comprising:

a first substrate equipped with a first stator electrode;

a second substrate equipped with a second stator electrode positioned to face the first stator electrode;

a movable section having first and second surfaces that are positioned to face the first and second stator electrodes, respectively; and a driving circuit, which applies a first potential to the first surface of the movable section and to the second stator electrode and also applies a second potential differing from the first potential to the first stator electrode under a first moving mode in which the movable section is moved toward the first substrate, which applies the first potential to the second surface of the movable section and to the first stator electrode and also applies the second potential to the second stator electrode under a second moving mode in which the movable section is moved toward the second substrate, and which permits at least one of the first stator electrode, the second stator electrode, the first surface of the movable section, and the second surface of the movable section to be kept electrically floating under a holding mode in which the movable section is kept attached to one of the first and second substrates.

Also, according to an another aspect of the present invention, there is provided a driving method of an electrostatic actuator including a first substrate equipped with a first stator electrode, a second substrate equipped with a second stator electrode positioned to face the first stator electrode, and a movable section having first and second surfaces that are positioned to face the first and second stator electrodes, respectively;

the driving method comprising:

applying a first potential to each of the first surface of the movable section and the second stator electrode and also applying a second potential differing from the first potential to the first stator electrode so as to move the movable section toward the first substrate;

applying the first potential to each of the second surface of the movable section and the first stator electrode and also applying the second potential to the second stator electrode so as to move the movable section toward the second substrate; and holding the movable section by permitting at least one of the first stator electrode, the second stator electrode, the first surface of the movable section and the second surface of the movable section to be kept electrically floating.

Furthermore, according to a yet another aspect of the present invention there is provided an image pickup apparatus comprising:

a first substrate equipped with a first stator electrode;

a second substrate equipped with a second stator electrode positioned to face the first stator electrode;

a movable section having first and second surfaces that are positioned to face the first and second stator electrodes, respectively;

a driving circuit, which applies a first potential to the first surface of the movable section and to the second stator electrode and also applies a second potential differing from the first potential to the first stator electrode under a first moving mode in which the movable section is moved toward the first substrate, which applies the first potential to the second surface of the movable section and to the first stator electrode and also applies the second potential to the second stator electrode under a second moving mode in which the movable section is moved toward the second substrate, and which keeps at least one of the first stator electrode, the second stator electrode, the first surface of the movable section, and the second surface of the movable section to be electrically floated under a holding mode in which the movable section is kept attached to one of the first and second substrates;

a lens provided in the movable section to transfer an image of a subject; and an image pickup device to detect the image of the subject transferred from the lens.

BRIEF DESCRIPTION OF THE SEVERAL VIEWS OF THE DRAWING

FIGS. 5A and 5B are a block diagram and a circuit diagram, respectively, exemplifying the driving circuit of the electrostatic actuator shown in FIG. 3;

FIGS. 9A to 9F collectively form a timing chart showing the waveform of the driving signal for driving the electrostatic actuator shown in FIG. 8.

DETAILED DESCRIPTION OF THE INVENTION

An electrostatic actuator according to one embodiment of the present invention will now be described with reference to the accompanying drawings.

Figure 1:
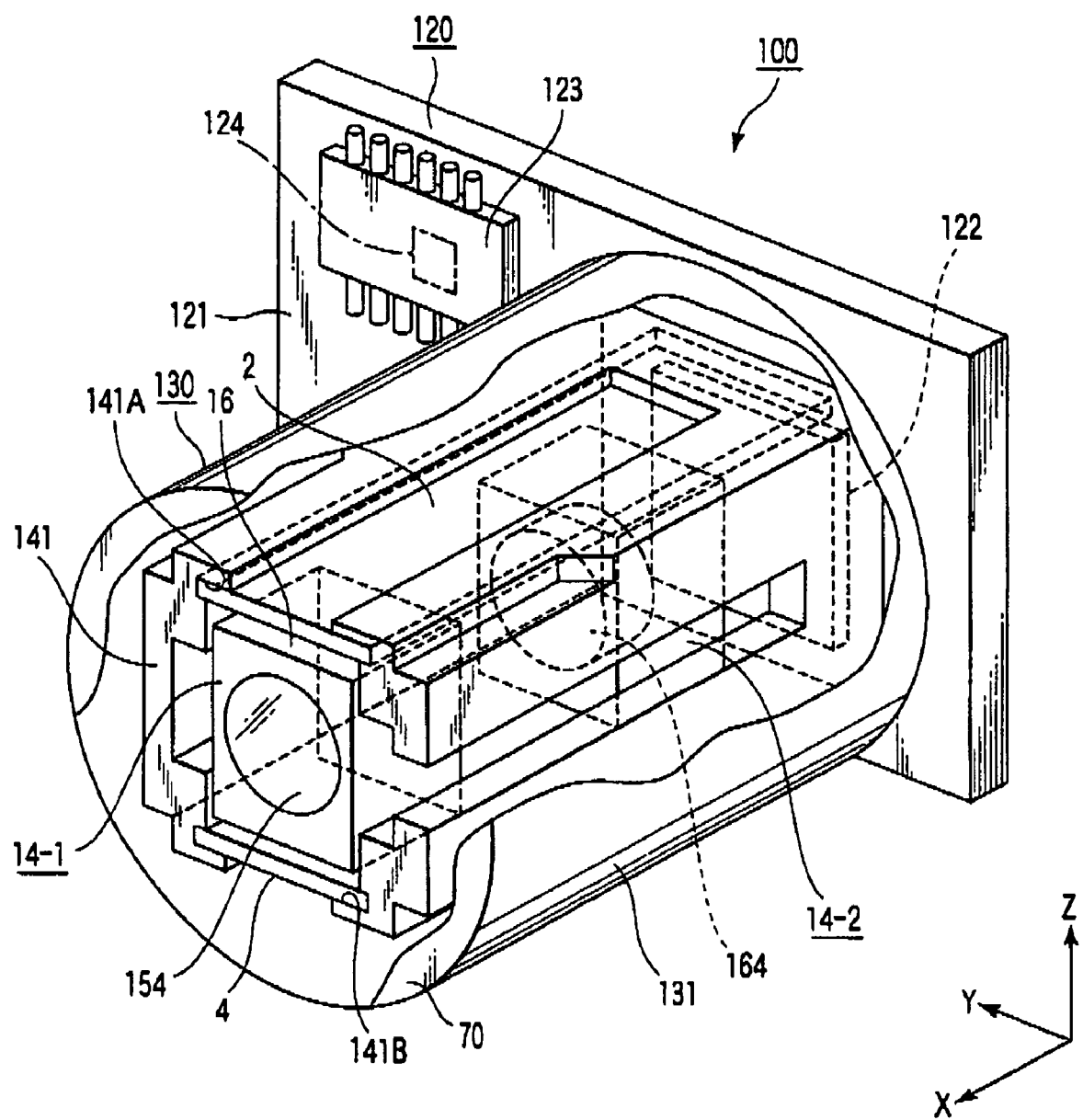
FIG. 1 is a perspective view schematically showing an image pickup apparatus using an electrostatic actuator according to an embodiment of the present invention.
Figure 2:
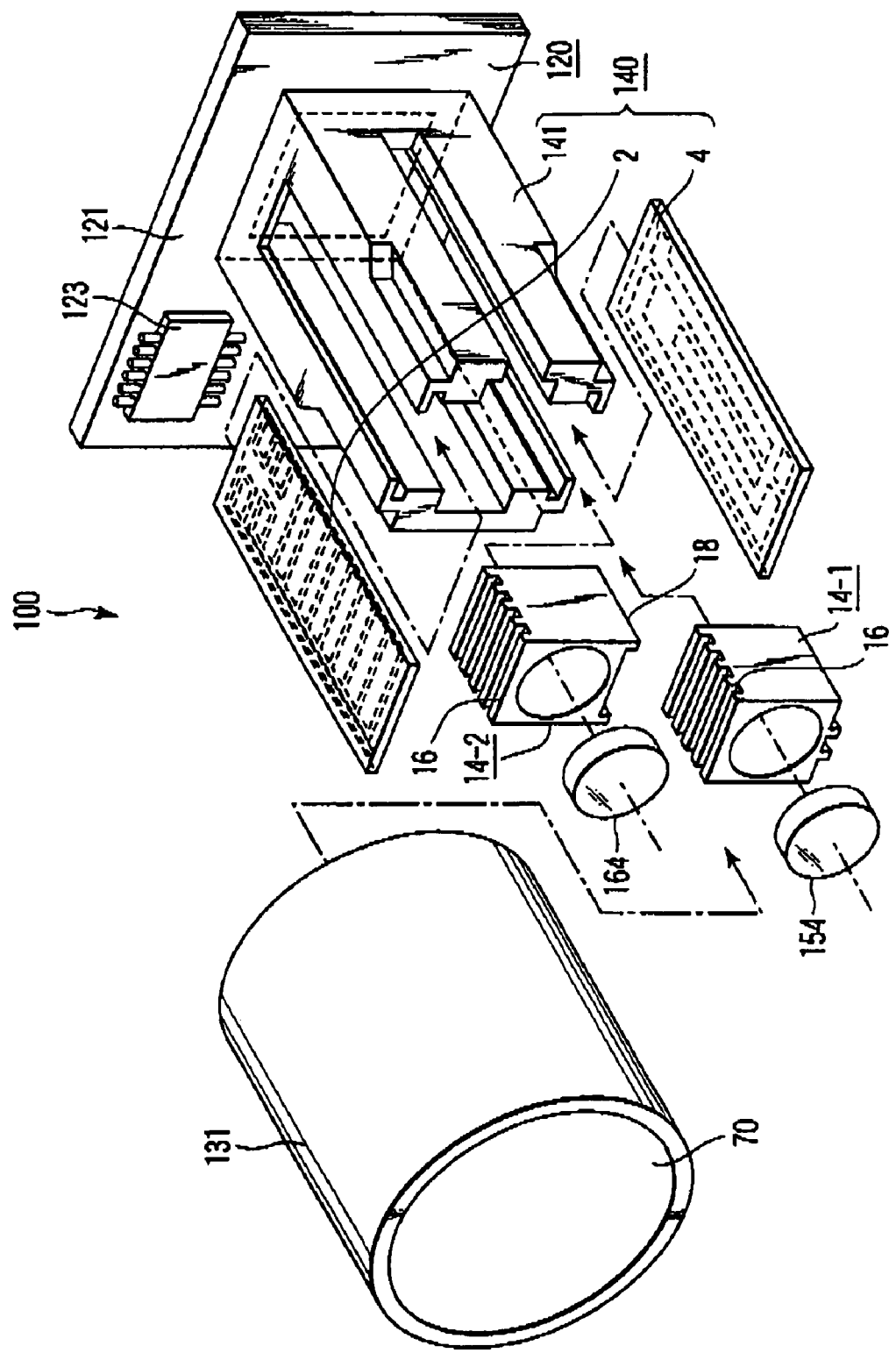
FIG. 2 is an exploded perspective view schematically showing the image pickup apparatus using the electrostatic actuator shown in FIG. 1.
Figure 3:
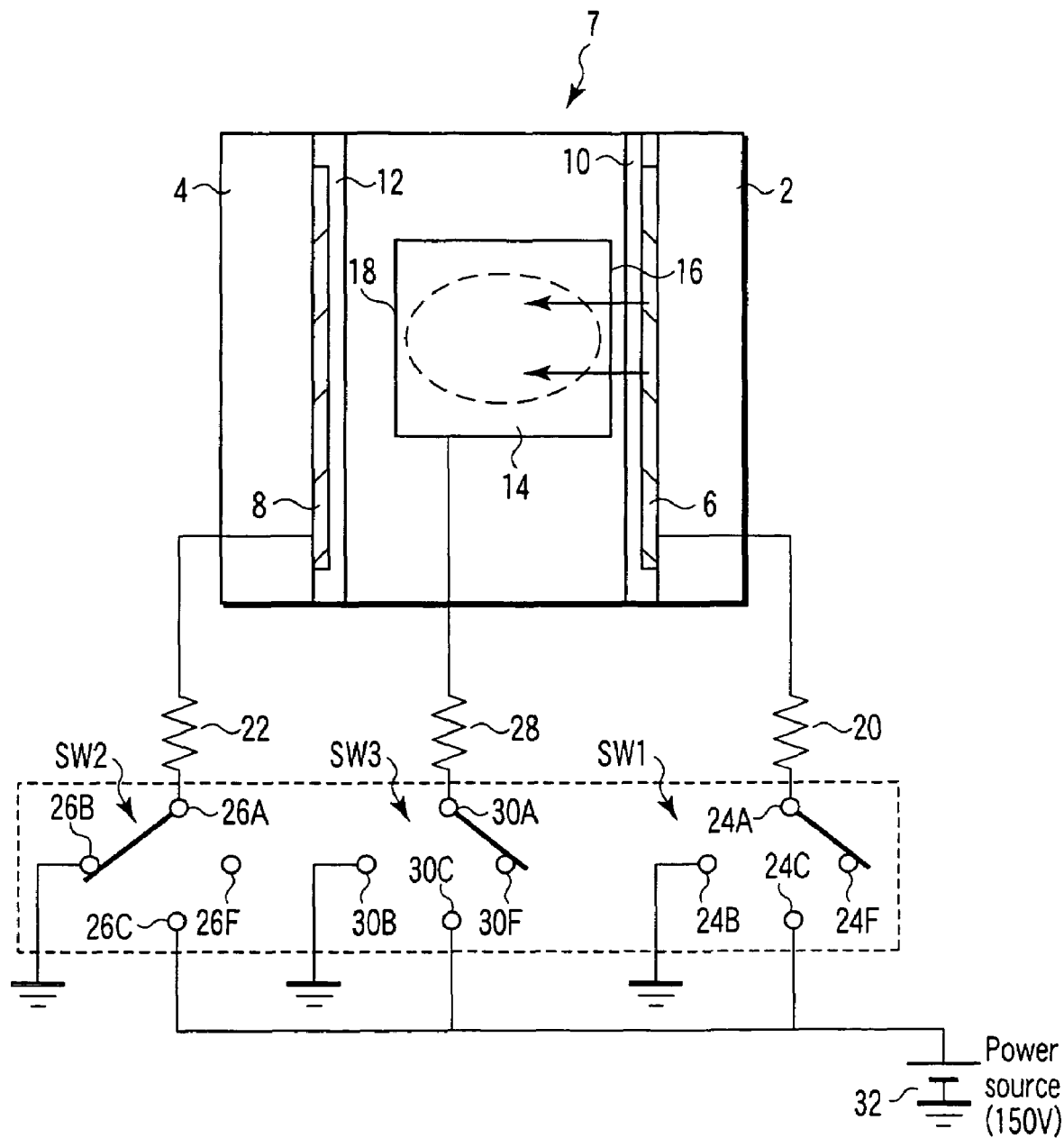
FIG. 3 is a block diagram schematically showing a simplified construction of an electrostatic actuator shown in FIG. 1.

FIG. 1 is a partly cutaway perspective view schematically showing an image pickup apparatus into which an electrostatic actuator according to a first embodiment of the present invention is incorporated. FIG. 2 is an exploded perspective view of the image pickup apparatus 100 shown in FIG. 1. FIG. 3 is a block diagram schematically showing a simplified construction of an electrostatic actuator shown in FIG. 1.

In FIGS. 1 and 2, arrows X, Y, Z show three orthogonal directions. In particular, arrow X corresponds to the direction in which a penetrating portion extends penetratingly through a stator frame 141 and also to the direction in which a first and second movable sections 14-1 and 14-2 move. In the description of the embodiments, arrow Z in FIG. 1 is assumed to show an upward direction.

The image pickup apparatus 100 comprises the zoom lens unit 130 that transmits an image of a subject according to a zoom scale factor and an image pickup element section 120 that photographs the transmitted subject image. The zoom lens unit 130 includes lenses 154 and 164 described below to transmit the subject image according to a predetermined zoom ratio. The image pickup apparatus 100 comprises the image pickup element section 120 and the zoom lens unit 130. The image pickup element section 120 comprises a substrate 121, and a sensor 122 such as a CCD and a controlling electronic part 123 which are arranged on the substrate 121; the subject image is formed on the sensor, which thus detects the subject image. A driving control circuit 124 is incorporated into the electronic part 123 to drive the zoom lens unit 130, composed of an electrostatic actuator and described later.

The zoom lens unit 130 comprises a cylindrical cover 131 internally having a cavity portion extending in the direction X, a stator 140 fixed in the cavity portion, and a first movable section 14-1 and a second movable section 14-2 independently driven in the stator 140, as shown in FIGS. 1 and 2. The first and second movable sections 14-1 and 14-2 are inserted and arranged in the stator frame 41 so that the movable sections 14-1 and 14-2 can move along the direction X of the optical axis while being separated from each other.

The stator 140 comprises a stator frame 141 that is a hollow, parallelepiped frame having a cavity portion. The stator frame 141 has an upper inner surface 141A and a lower inner surface 141B located opposite each other. A first substrate 2 is attached to the upper inner surface 141A to drive the first and second movable sections 14-1 and 14-2. Moreover, a second substrate 4 is attached to the lower inner surface 41B to hold the movable sections 14-1 and 14-2 at particular positions.

The cylindrical cover 131 or stator frame 141 is sealed and maintained in a vacuum, air-tight state by a sealing member (not shown); external dust, moisture, or the like is prevented from entering the cylindrical cover 131 or stator frame 141. For example, a glass plate 70 may be used to seal the front surface of the cylindrical cover 131. The sealed space may be maintained in a substantially vacuum state or an inert gas such as a nitrogen gas may be sealed into the space. Thus, the first and second movable sections 14-1 and 14-2 and the first and second substrates 2 and 4 are arranged in the vacuum space or the space into which the inert gas is sealed. This prevents discharge from occurring readily between each of the first and second movable sections 14-1 and 14-2 and the first and second substrates 2 and 4 even if a potential difference is applied to between them.

Each of the first and second movable sections 14-1, 14-2 comprises a substantially parallelepiped support formed of a conductive material having a hollow portion extending in the direction X as shown in FIGS. 1 and 2. The support can be formed by, for example, physically grinding or chemically etching a conductive material. Alternatively, the support may be formed by injecting a conductive resin. A movable electrode 16 is formed on the top surface of the support. Moreover, lenses 154 and 164 are fixed to the hollow portions of the first and second movable sections 14-1, 14-2, respectively.

FIG. 3 shows a simplified structure of the electrostatic actuator incorporated in the image pickup apparatus shown in FIGS. 1 and 2, which provided with a movable section 14 corresponding to one of the movable sections 14-1, 14-2 shown in FIG. 1 and being moved in a reciprocating mode. FIG. 3 also shows the peripheral circuit of the electrostatic actuator. As shown in FIGS. 1 to 3, the first and second substrates 2 and 4 are arranged to face each other in a manner to form a hollow cylindrical box 7 corresponding to the stator 140 as described above. First and second stator electrodes 6 and 8, which are flat, are formed on the inner surfaces of the first and second substrates 2 and 4, respectively. The first and second stator electrodes 6 and 8 are covered with first and second dielectric films 10 and 12 that are formed on the first and second substrates 2 and 4, respectively, so as to prevent a movable section 14 from being brought into direct contact with the first and second stator electrodes 6 and 8.

The movable section 14 is shaped to conform to the shape of the hollow portion inside the box 7, and is arranged in the hollow portion between the first and second stator electrodes 6 and 8 such that a small gap is formed between the movable section 14 and each of the first and second stator electrodes 6 and 8. The movable section 14 has first and second surfaces that are positioned to face the first and second stator electrodes 6 and 8, respectively, and movable electrodes 16 and 18, which are maintained at the same potential, are formed on the first and second surfaces, respectively, of the movable section 14. A part that can be moved slightly (in the right-left direction in the drawing) by the movable section 14, e.g., a lens 154 or 164 is mounted to the movable section 14. The movable section 14 is controlled to move slightly the part noted above so as to put the particular part under the optimum condition, e.g., the condition under which the vibration from the outside can be canceled.

Incidentally, it is possible for the movable electrodes 16, 18 not to be formed on those surfaces of the movable section 14 which are positioned to face the first and second stator electrodes 6, 8. As described herein later, it is also possible for the movable section 14 itself to be formed of a semiconductor so as to use those surfaces of the movable section 14 which are positioned to face the first and second stator electrodes 6, 8 as the movable electrodes 16, 18.

The first and second stator electrodes 6, 8 are connected to stator side terminals 24A, 26A of first and second switching elements SW1, SW2 via resistors 20, 22, respectively. Also, the movable electrodes 16, 18 are connected to a stator side terminal 30A of a third switching element SW3 via a resistor 28. The first, second and third switching elements SW1, SW2 and SW3 include first movable side terminals 24B, 26B, and 30B, which are connected to the ground, second movable side terminals 24C, 26C and 30C, which are connected to a voltage source 32, and third movable side terminals 24F, 26F and 30F, which are under the floating state, respectively.

In the electrostatic actuator shown in FIG. 3, the first and second switching elements SW1 and SW2 are switched as follows in accordance with the first and second moving modes in which the movable section 14 is moved toward the first and second substrates 2, 4, respectively. To be more specific, in the first moving mode, the stator side terminal 24A of the first switching element SW1 is connected to the second movable side terminal 24C, the stator side terminal 26A of the second switching element SW2 is connected to the first movable side terminal 26B, and the stator side terminal 30A of the third switching element SW3 is connected to the third movable terminal 30B. As a result, a high voltage is applied to the first stator electrode 6, and each of the movable electrodes 16, 18 and the second stator electrode 8 is connected to the ground. It follows that the movable section 14 is attracted by the first stator electrode 6 depending on the Coulomb force so as to be moved toward the first substrate 2 and held on the first stator electrode 6. The state that the movable section 14 is held on the first stator electrode 6 naturally includes the case where a prescribed clearance is provided between the movable section 14 and the first stator electrode 6. For example, the movable section 14 is disposed on the first dielectric film 10. In this case, a clearance corresponding to the thickness of the first dielectric film 10 is provided between the movable section 14 and the first stator electrode 6.

In the second moving mode, the stator side terminal 24A of the first switching element SW1 is connected to the first movable side terminal 24B, the stator side terminal 26A of the second switching element SW2 is connected to the second movable side terminal 26C, and the stator side terminal 30A of the third switching element SW3 is connected to third movable side terminal 30B. In this case, a high voltage is applied to the second stator electrode 8, and each of the movable electrodes 16, 18 and the first stator electrode 6 is connected to the ground. As a result, the movable section 14 is attracted toward the second stator electrode 8 by the Coulomb force so as to be moved toward the second substrate 4 and, thus, the movable section 14 is held on the second stator electrode 8. The state that the movable section 14 is held on the second stator electrode 8 naturally includes the case where a prescribed clearance is provided between the movable section 14 and the second stator electrode 8. For example, the second dielectric film 12 is interposed between the movable section 14 and the second stator electrode 8 such that a clearance corresponding to the thickness of the second dielectric film 12 is provided between the movable section 14 and the second stator electrode 8.

As described above, the first and second switching elements SW1 and SW2 are alternately connected to the voltage source 32 and the ground so as to repeat the first and second moving modes. In other words, the movable section 14 is alternately attracted by the first and second stator electrodes 6, 8, with the result that the movable section 14 is slightly moved between the first and second stator electrodes 6 and 8.

Incidentally, even where the stator side terminal 30A of the third switching element SW3 is connected to the third movable terminal 30C, the first and second switching elements SW1 and SW2 are alternately connected to the voltage source 32 and the ground. As a result, the movable section 14 is alternately attracted by the first and second stator electrodes 6, 8 so as to permit the movable section 14 to be slightly moved between the first and second stator electrodes 6 and 8.

Where the electrostatic actuator is shifted into the holding mode in which the movable section 14 is held stationary under the state that the movable section 14 is in contact with the first dielectric film 10 on the first stator electrode 6 as shown in FIG. 3, the stator side terminal 26A of the second switching element SW2 is connected to the first movable side terminal 26B, the stator side terminal 24A of the first switching element SW1 is connected to the third movable side terminal 24F, and the stator side terminal 30A of the third switching terminal SW3 is connected to the third movable side terminal 30F, as shown in FIG. 3. It follows that the second stator electrode 8 is connected to the ground, and the movable electrode 16 and the first stator electrode 6, which are in contact with each other, are held under the floating state.

Under the state of the holding mode in which the movable section 14 is in contact with the dielectric film 10 on the first stator electrode 6, each of the movable section 14 and the first stator electrode 6 is polarized, with the result that the movable section 14 is held in contact with the first dielectric film 10 on the first stator electrode 6 by the Coulomb force generated between the movable section 14 and the first stator electrode 6. It is reasonable to state that the movable section 14 and the first stator electrode 6, which are under the floating state and which are polarized, equivalently form collectively a series circuit consisting of a resistor and a capacitor. The polarized charge is leaked with time from the series circuit consisting of the resistor and the capacitor. If the charge is leaked so as to make it impossible to hold the movable section 14, the position of the movable section 14 is deviated by the impact from the outside. It follows that, when the electrostatic actuator is under the holding mode, the stator side terminal 24A of the first switching element SW1 is periodically connected to the second movable side terminal 24C under the state that the stator side terminal 30A of the third switching element SW3 is connected to the first movable side terminal 30B, with the result that a high voltage is applied to the first stator electrode 6. The movable section 14 and the first stator electrode 6 are sufficiently polarized by the high voltage application. It follows that the movable section 14 is held on the dielectric film 10 on the first stator electrode 6.

In the holding mode described above, the movable electrode 16 is in contact with the first dielectric film 10 on the first stator electrode 6. On the other hand, under the state that the movable electrode 18 is in contact with the second dielectric film 12 on the second stator electrode 8, the movable electrode 18 and the second stator electrode 8 are held under the floating state, with the result that the movable section 14 is held on the second dielectric film 12 on the second stator electrode 8.

Also, in the holding mode described above, the movable section 14 is held stationary under the state that the movable electrode 16 is in contact with the first dielectric film 10 on the first stator electrode 6 or the movable electrode 18 is in contact with the second dielectric film 12 on the second stator electrode 8. However, it is not absolutely necessary for the movable electrode to be in contact with the first dielectric film 10 or the second dielectric film 12. In other words, it is possible for the movable section 14 to be moved toward the first substrate 2 or the second substrate 4 so as to be held at a dead point. For example, where a stopper such as a support rod is mounted to each of the first and second substrates 2, 4, the position at which any of the movable electrodes 16, 18 is in contact with the stopper forms a dead point. In this case, it is possible for the movable section 14 to be held stationary at the dead point.

In the embodiment shown in FIG. 3, the movable electrode 16 and the first stator electrode 6 are held under the floating state. However, it is also possible for only one of the movable section 16 and the first stator electrode 6 to be held under the floating state. In addition, it is further possible for not only the movable electrode 16 and the first stator electrode 6 but also the second stator electrode 8 to be held under the floating state. In order to prevent the charge leakage by the polarization and to maintain a sufficiently charged state, it is desirable for all the electrodes 6, 8 and 16 to be held under the floating state.

Similarly, when the movable electrode 18 and the second stator electrode 8 are held under the floating state, it is possible for only one of these electrodes to be held under the floating state. It is also possible for not only the movable electrode 18 and the second stator electrode 8 but also the first stator electrode 6 to be held under the floating state.

In the embodiment shown in FIG. 3, the movable electrodes 16, 18 are mounted to the movable section 14. It is possible for the movable electrodes 16, 18 not to be connected directly to the third switching element SW3 such that these electrodes 16, 18 are connected to the ground or the voltage source 32 via the body of the movable section 14. Where the movable section 14 is formed of a semiconductor, and the movable electrodes 16, 18 are formed on the surfaces of the movable section 14, the resistance value of the series circuit consisting of a resistor and a capacitor and formed between the movable section 14 under the floating state and each of the stator electrodes 6 and 8 can be set relatively large so as to make it possible to set the discharge time constant of the charge at a large value. It follows that the period during which a high voltage is applied periodically to the first stator electrode 6 can be set relatively long. As a result, the movable section 14 and the first stator electrode 6 are polarized so as to prolong the period during which the movable section 14 is held by the dielectric film 10 on the first stator electrode 6. Such being the situation, the power consumption can be further decreased.

Figures 4, 7:
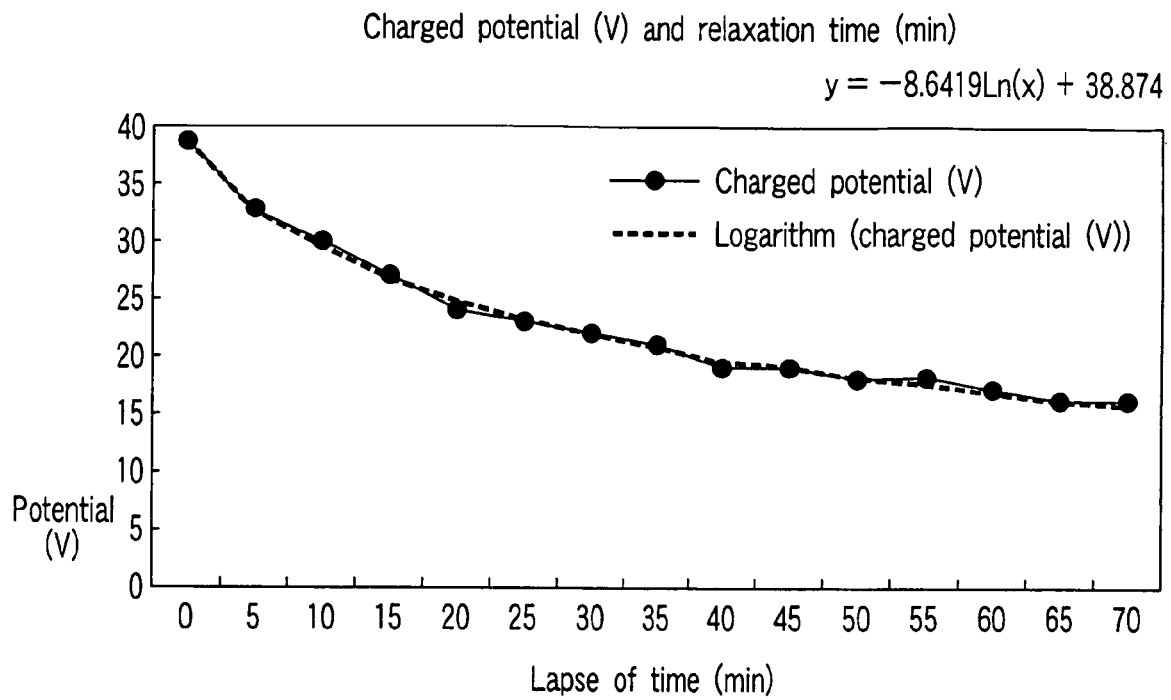
FIG. 4 is a graph showing the relationship between the potential generated by the electric charge remaining between the movable section and the stator electrode and the relaxation time, covering the case where the movable section shown in FIG. 3 is formed of a specified material.
FIG. 7 is a table showing the truth value of each section operated by the signal imparted to the driving circuit shown in FIG. 5A.

FIG. 4 is a graph showing the change of the potential in the stator electrodes 6 and 8 based on the charge leaking from the series circuit consisting of a resistor and a capacitor, which is equivalently generated between the movable section 14 under the floating state and each of the stator electrodes 6 and 8, covering the case where the movable section 14 is formed of a semiconductor. In other words, FIG. 4 shows the change of the residual charge, covering the case where the movable section 14 is formed of a material applying a prescribed resistance value. As shown in FIG. 4, where the movable section 14 is formed of a semiconductor, the potential in the stator electrodes 6 and 8 is maintained over a relatively long time and, thus, it suffices to apply a high voltage to the first stator electrode 6 a sufficiently long time later. The characteristics as shown in FIG. 4 can be similarly measured with respect to other materials, though the relaxation time and the potential measured differ from those shown in FIG. 4. The graph shown in FIG. 4 is changed depending on the properties of the materials used, the voltage applied to the electrode, and the peripheral environment. For example, if the humidity is high, the amount of the charge leaking from the air is increased so as to change the graph shown in FIG. 4. As the system application of the electrostatic actuator, the intermittent charge supply from the power source at a prescribed time interval can be determined in a manner to meet the equipment design and the system design in accordance with the characteristics shown in FIG. 4.

FIGS. 5A and 5B show the specific circuit construction of the driving circuit of the electrostatic actuator shown in FIG. 3. The driving circuit shown in FIG. 5A is constructed to generate the driving voltage signal alone applied to one of the stator electrodes 6 and 8, e.g., the stator electrode 6. The driving circuit for generating the driving voltage signal applied to the other stator electrode 8 is complementary to the circuit for generating the driving voltage signal that permits the driving signal to be applied simply to the stator electrode 6. Therefore, the driving circuit for generating the driving voltage signal applied to the other stator electrode 8 is substantially equal to that shown in FIG. 5A and, thus, the particular driving circuit is omitted. Also, in the circuit shown in FIG. 5A, the circuit for applying voltage to the movable electrodes 16, 18 of the movable section 14 is constructed like the circuit shown in FIG. 5A and, thus, the particular circuit construction is omitted in FIG. 5A. As apparent from the description given above, it is desirable for the electrodes 16, 18 of the movable section 14 to be kept floating in the holding mode.

As shown in FIG. 5A, the electrostatic actuator is equivalently replaced by a series circuit 36 consisting of a capacitor 32 and a resistor 34. In the circuit shown in FIG. 5A, the electrodes 16, 18 of the movable section 14 are assumed to be maintained at the ground potential in the following description. The driving circuit comprises a power source switch 38 connected between a power source line 35 and the ground. The power source switch 38 is connected to a booster circuit 40 for boosting the voltage supplied from the power source line 35, and the boosted high voltage is supplied to a driver circuit 42. The driver circuit 42 is equipped with an input signal terminal 44 to which is supplied a timing signal Signal_In for driving the electrostatic actuator and a control signal terminal 46 to which is supplied a control signal Pos_Control for setting the electrostatic actuator at the first or second moving mode. The driver circuit 42 is also equipped with an output terminal 48 for generating a driving voltage signal Vout during the drive mode to the electrostatic actuator that is equivalently denoted by the series circuit 36. The output terminal 48 also generates a stop voltage signal Vout that periodically charges the electrostatic actuator during the holding mode so as to maintain the movable section 14 under a stopped state.

If a driving mode signal is supplied as the Pos_Control signal to the control signal terminal 46, the driver circuit 42 sets the driving circuit at the driving mode so as to permit a high voltage and a low voltage to be supplied alternately to the output terminal 48 in accordance with the timing signal Signal_In supplied to the signal input terminal 44. Also, if a holding mode signal is supplied to the control signal terminal 46, the driver circuit 42 sets the driving circuit in the holding mode. In this case, even if the timing signal Signal_In is supplied to the signal input terminal 44, the output terminal 48 is kept in the floating state so as to charge the capacitor 32 of the electrostatic actuator at a prescribed period, with the result that the movable section 14 is kept attached to one of the stator electrodes 6 and 8. Incidentally, it is possible to perform the control to charge the capacitor 32 at a prescribed period by supplying a timing signal Signal_In to the signal input terminal 44 and a control signal Pos_Control to the control signal terminal 46 by using, for example, a controller that is mounted outside.

As shown in FIG. 5B, first and second driver circuits 42-1 and 42-2 can be used as examples of the driver circuit 42 shown in FIG. 5A. An equivalent series circuit 36-1 on the side of the first stator electrode 6 is connected to an output terminal 48-1 of the driver circuit 42-1. As shown in the drawing, the equivalent series circuit 36-1 is formed of a capacitor 32-1 and a resistor 34-1. Likewise, an equivalent series circuit 36-2 on the side of the second stator electrode 8 is connected to an output terminal 48-2 of the driver circuit 42-2. As shown in the drawing, the equivalent series circuit 36-2 is formed of a capacitor 32-2 and a resistor 34-2.

In the driver circuit 42-1 shown in FIG. 5B, a series circuit consisting of a PNP transistor TR1-1 and an NPN transistor TR2-1 is connected between the power source line 35 and the ground, and the junction between the transistors TR1-1 and TR2-1 is connected to the output terminal 48-1 via a resistor 54-1. It should be noted that the PNP transistor TR1-1 and the NPN transistor TR2-1 correspond to the switching element SW1 shown in FIG. 3. Also, a series circuit consisting of a resistor 53-1 and an NPN transistor 56-1 is connected between the power source line 35 and the ground, and the junction between the resistor 53-1 and the NPN transistor 56-1 is connected to the base of the transistor TR1-1. The signal input terminal 44-1 is connected to the base of the NPN transistor 56-1 via an inverter 58-1, and an AND circuit 60-1 is connected to the base of the NPN transistor TR2-1. The input terminals of the AND circuit 60-1 are connected to the signal input terminal 44-1 and the control signal terminal 46.

Also, in the driver circuit 42-2 shown in FIG. 5B, a series circuit consisting of a PNP transistor TR-1 and an NPN transistor TR2-2 is connected between the power source line 35 and the ground, and the junction between the transistors TR1-1 and TR2-2 is connected to an output terminal 48-2 via a resistor 54-2. It should be noted that the PNP transistor TR1-1 and the NPN transistor TR2-2 correspond to the switching element SW2. Also, a series circuit consisting of a resistor 53-2 and an NPN transistor 56-2 is connected between the power source line 35 and the ground, and the junction between the resistor 53-2 and the NPN transistor 56-2 is connected to the base of the transistor TR1-2. The signal input terminal 44-2 is connected to the base of the NPN transistor 56-2 via an inverter 58-2, and an AND circuit 60-2 is connected to the base of the NPN transistor TR2-2. The input terminals of the AND circuit 60-2 are connected to the signal input terminal 44-2 and the control signal terminal 46.

Figure 6A:
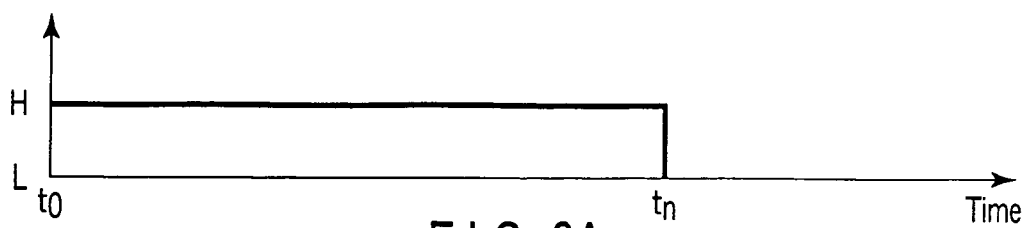
FIGS. 6A to 6G collectively form a timing chart denoting the waveform of the signal imparted to the driving circuit shown in FIG. 5A.
Figure 6B:
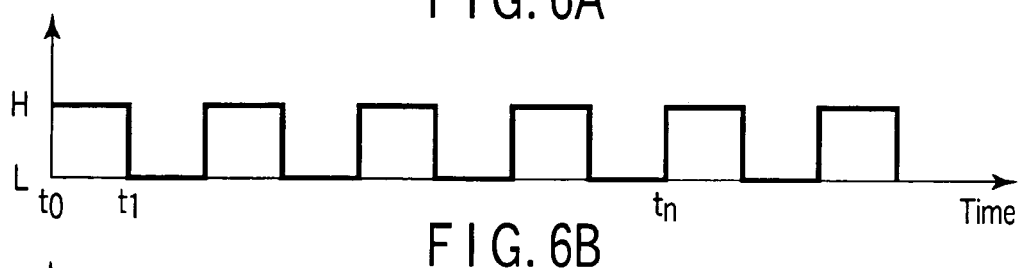
Figure 6C:
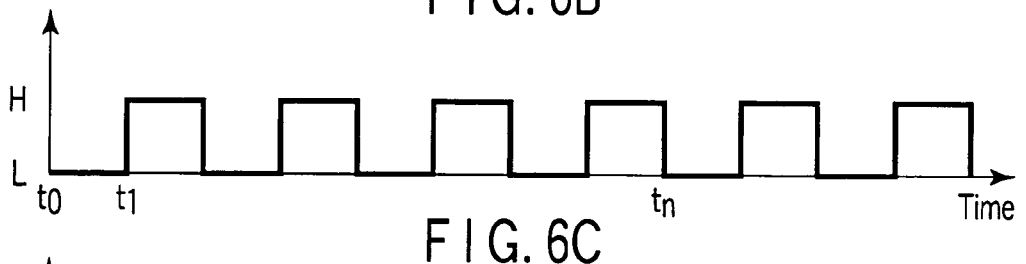

The operation of the driver circuit shown in FIG. 5B will now be described with reference to FIG. 5B. A control signal Pos_Control having a high level as shown in FIG. 6A is supplied to the control signal terminal 46 so as to set the driver circuits 42-1 and 42-2 in the first and second moving modes, respectively. If a timing signal Signal_In having a high level as shown in FIG. 6B is supplied to the signal input terminal 44-1 of the driver circuit 42-1 at time $t_0$, the output of the inverter 58-1 is caused to have a low level as shown in FIG. 6C, with the result that the NPN transistor 56-1 is turned off. It follows that the base potential of the PNP transistor TR1-1 is caused to have a high level and, thus, the PNP transistor TR1-1 is also turned off. The timing signal Signal_In having a high level is supplied to one input terminal of the AND circuit 60-1 having a control signal Pos_Control of a high level supplied to the other input terminal, as shown in FIG. 6B. It follows that the output from the AND circuit 60-1 is caused to have a high level so as to turn on the NPN transistor TR2-1 and, thus, an output signal of a low level, e.g., the ground potential Vout, is generated from the output terminal 48-1 via the resistor 54-1. As a result, the stator electrode 6 is connected to the ground.

Figure 6D:
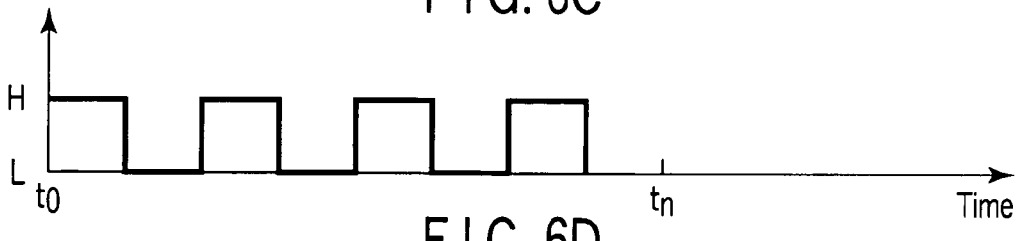
Figure 6E:
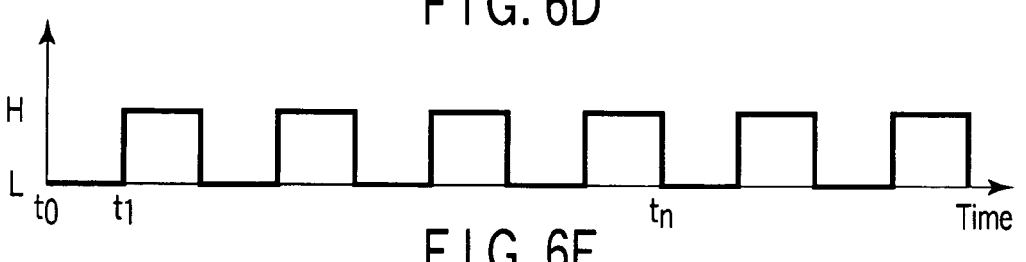

On the other hand, if a timing signal Signal_In of a low level is supplied at time $t_0$ to the signal input terminal 44-2 of the driver circuit 42-2 as shown in FIG. 6E, the output of the inverter 58-2 is caused to have a high level so as to turn on the NPN transistor 56-2. It follows that the base potential of the PNP transistor TR1-2 is lowered to the ground potential and, thus, the PNP transistor TR1-2 is turned on. A timing signal Signal_In having a low level as shown in FIG. 6E is supplied to one input terminal of the AND circuit 60-2 having a control signal Pos_Control of a high level supplied to the other input terminal. As a result, the output signal generated from the AND circuit 60-2 is caused to have a low level as shown in FIG. 6G so as to turn off the NPN transistor TR2-2 and, thus, the power source potential Vout of a high level is generated from the output terminal 48-2 via the resistor 54-2. It follows that a high potential is applied to the second stator electrode 8 so as to set the second moving mode and, thus, the movable section 14 is attracted toward the second stator electrode 8.

Figure 6F:
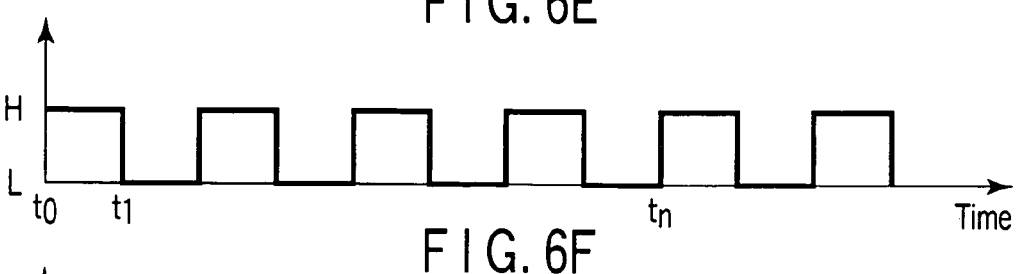
Figure 6G:
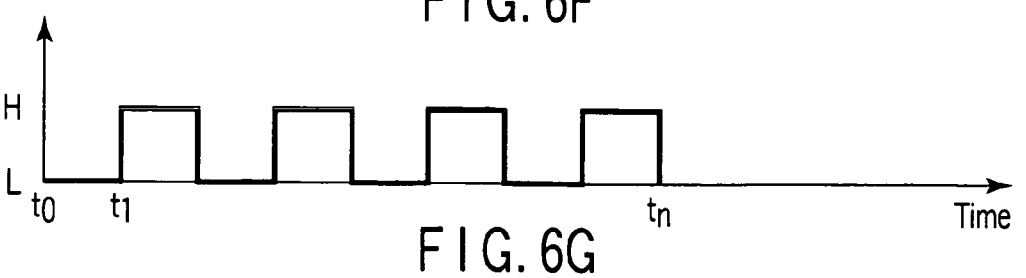

If a timing signal Signal_In of a high level is supplied at time $t_1$ to the signal input terminal 44-2 of the driver circuit 42-2 as shown in FIG. 6E, the output of the inverter 58-2 is caused to have a low level so as to turn off the NPN transistor 56-2, as shown in FIG. 6F. As a result, a high potential is applied to the second stator electrode 8 so as to set the second moving mode and, thus, the movable section 14 is attracted toward the second stator electrode 8.

If a timing signal Signal_In of a high level is supplied to the signal input terminal 44-2 of the driver circuit 42-2 at time $t_1$ as shown in FIG. 6E, the output of the inverter 58-2 is caused to have a low level as shown in FIG. 6F so as to turn off the NPN transistor 56-2. It follows that the base potential of the PNP transistor TR1-2 is caused to have a high level so as to turn off the PNP transistor TR1-2, too. As shown in FIG. 6F, a timing signal Signal_In having a high level is supplied to one input terminal of the AND circuit 60-2 having a control signal Pos_Control of a high level supplied to the other input terminal, as shown in FIG. 6F. It follows that the output from the AND circuit 60-2 is caused to have a high level as shown in FIG. 6G so as to turn on the NPN transistor TR2-2 and, thus, the ground potential of a low level is generated from the output terminal 48-2 via the resistor 54-2. As a result, the second stator electrode 8 is connected to the ground.

Also, if a timing signal Signal_In of a low level is supplied to the signal input terminal 44-1 of the driver 42-1 at time $t_1$ as shown in FIG. 6B, the output of the inverter 58-1 is caused to have a high level so as to turn on the NPN transistor 56-1 as shown in FIG. 6C. It follows that the base potential of the PNP transistor TR1-1 is lowered to the ground potential so as to turn on the PNP transistor TR1-1. A timing signal Signal_In of a low level is supplied to one input terminal of the AND circuit 60-1 having a control signal Pos-Control having a high level supplied to the other input terminal. It follows that the output from the AND circuit 60-1 is caused to have a low level so as to turn off the NPN transistor TR2-1, with the result that a power source potential Vout of a high level is generated from the output terminal 48-1 via the resistor 54-1, as shown in FIG. 6D. As a result, a high potential is applied to the stator electrode 6 so as to set the first moving mode, and the movable section 14 is attracted from the second stator electrode 8 toward the first stator electrode 6.

As described above, the movable section 14 is moved slightly between the first and second stator electrodes 6 and 8, as long as the control signal Pos_Control is maintained at a high level. If the control signal Pos_Control is changed to have a low level at a certain time $t_n$, i.e., if a holding mode signal is supplied as the control signal Pos_Control to the control signal terminal 46, the outputs from the AND circuits 60-1 and 60-2 are maintained at a low level, as shown in FIGS. 6D and 6G. As a result, the NPN transistors TR2-1 and TR2-2 are turned off so as to cause the output terminals 48-1 and 48-2 to be isolated from the ground potential, and the output terminals 48-1 and 48-2 are held under the floating state. If the PNP transistors TR1-1 and TR1-2 are turned on and off under the floating state, the capacitors 32-1 and 32-2 are charged at the prescribed period so as to set the movable section 14 in the holding mode, and the movable section 14 is kept attracted toward any one of the first and second stator electrodes 6 and 8.

FIG. 7 is a truth table of the operation described above, showing the relationship among the timing signals Signal_In supplied to the signal input terminals 44-1, 44-2, the control signal Pos_Control supplied to the control signal terminal 46, the output signals Vout generated from the output terminals 48-1, 48-2, and the operation of the transistors TR1 (TR1-1, TR1-2) and TR2 (TR2-1, TR2-2). If the timing signal Signal_In has a high level (High) and the control signal Pos_Control has a high level (High), the transistor TR1 is opened (Open), the transistor TR2 is closed (Close), and the output Vout has a low level (Low). Also, if the timing signal Signal_In has a low level (Low) and the control signal Pos_Control has a high level (High), the transistor TR1 is closed (Close), the transistor TR2 is opened (Open), and the output Vout has a high level (High). On the other hand, if the control signal Pos_Control has a low level (Low) and the timing signal has a high level (High), the transistor TR1 is opened (Open), the transistor TR2 is also opened (Open), and the output Vout is held floating (Floating). Further, if the control signal Pos_Control has a low level (Low) and the timing signal Signal_In has a low level (Low), the transistor TR1 is closed (Close), the transistor TR2 is opened (Open), and the output Vout charges the capacitor 32 at a high level (High).

Incidentally, under the state that both the transistor TR1 (TR1-1, TR1-2) and the transistor TR2 (TR2-1, TR2-2) are closed (Close), a high voltage (150V) flows as it is as a penetrating current so as to form a forbidden state. Bipolar transistors are used in the embodiment described above. However, it is possible to use other devices capable of performing the switching operation such as MOSFETs.

As described above, the floating state can be realized by simply adding a control terminal, to which is supplied a control signal Pos_Control for allowing the position of the movable section to be held by the residual charge, to the driver circuit 42, as shown in FIGS. 5A and 5B. In other words, the floating state can be realized while suppressing the increase in the number of pins (terminals) of the driver IC to the minimum level. In general, if the number of pins is markedly increased, it is necessary to increase the chip area and it is also necessary to change the input-output section from the peripheral type (bump formation on four sides of IC) into the area type (entire surface), leading to an increase in the cost of the entire device. However, the driver circuit 42 shown in FIGS. 5A and 5B makes it possible to realize the floating state without increasing the cost.

An electrostatic actuator according to a modification of the present invention will now be described with reference to FIG. 8. The reference numerals in FIG. 8, which are equal to those shown in FIG. 3, denote the same members of the apparatus and, thus, the explanation thereof is omitted in the following description.

Figure 8:
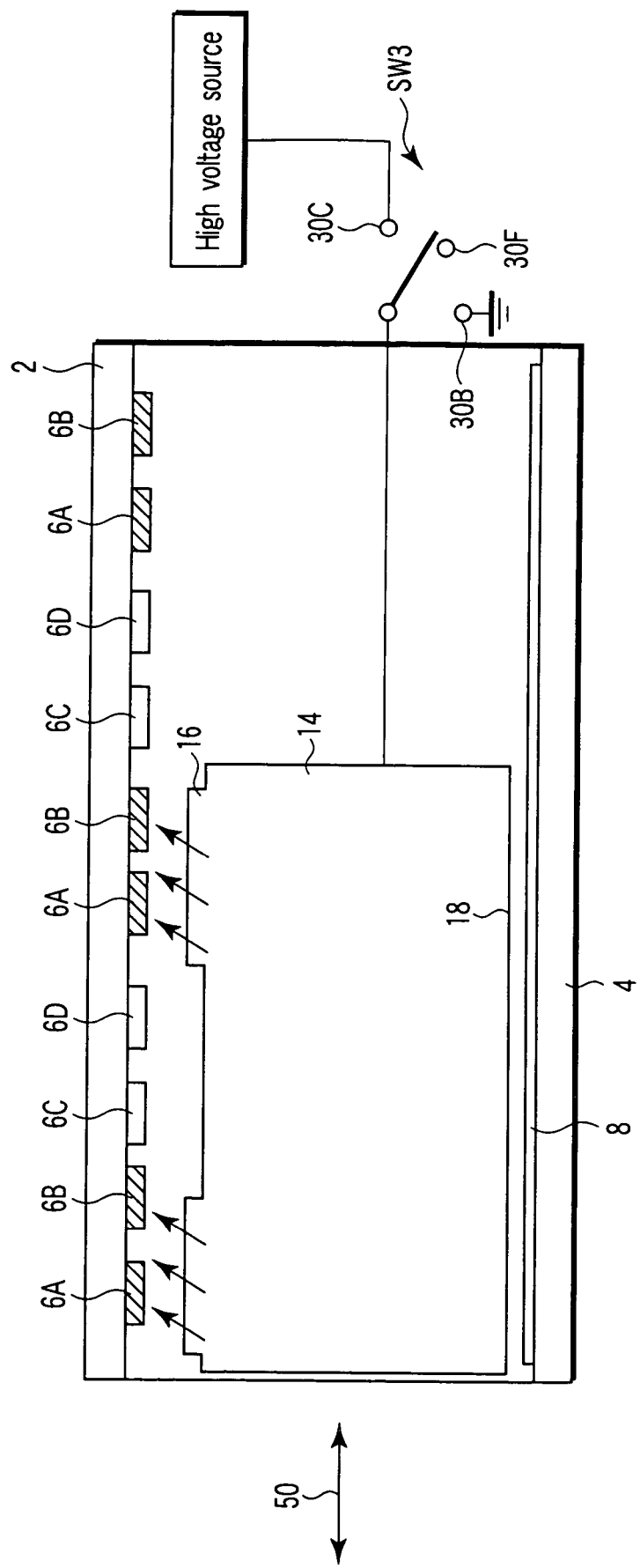
FIG. 8 is a block diagram schematically showing the construction of a modification of the electrostatic actuator according to one embodiment of the present invention.

In the electrostatic actuator shown in FIG. 8, the first stator electrode 6 is divided into a plurality of segment electrodes 6A to 6D that are electrically separated from each other. These plural segment electrodes 6A to 6D are arranged in a moving direction 50 corresponding to the arrow X of the movable section 14, and driving signals, e.g., the driving signals shown in FIGS. 9A to 9D, are applied to these plural segment electrodes 6A to 6D. Also, a switching element SW3 is connected to the movable section 14. If the switching element SW3 is connected to a terminal 30F, the movable section 14 is put under the floating state. It is of no difficulty for those skilled in the art to realize the switching element SW3 from the driver circuit 42 shown in FIGS. 5A and 5B. As apparent from the description in the four patent documents quoted previously, the electrostatic actuator shown in FIG. 8 is set in the shift mode for shifting the movable section 14 by controlling the timing of the voltage applied to the plural segment electrodes 6A to 6D. To reiterate, the movable section 14 is moved forward or backward in the direction denoted by the arrow 50 while being moved slightly (vibrated) in the vertical direction between the plural segment electrodes 6A to 6D and the second stator electrode 8.

If the shift mode is started at time $t_{10}$ under the state that the movable section 14 is connected to the ground as shown in FIG. 9F, a high voltage is applied to the segment electrodes 6A, 6B as shown in FIGS. 9A and 9B. If the other segment electrodes 6C, 6D and the second stator electrode 8 are connected under the particular state to the ground potential as shown in FIGS. 9C, 9D and 9E, the movable section 14 is attracted toward the segment electrodes 6A, 6B. Then, if the segment electrode 6A is connected to the ground as shown in FIG. 9A and the second stator electrode 8 is switched to a high potential at time $t_{11}$, the attractive force of the second stator electrode 8 is increased even if a high voltage is applied to the segment electrode 6B as shown in FIG. 9B so as to cause the movable section 14 to be attracted toward the stator electrode 8. If the movable electrodes 16, 18 are switched to a high potential at time $t_{12}$ as shown in FIG. 9E, the movable section 14 is directed toward the segment electrodes 6A, 6B by the repulsive force between the movable electrodes 16, 18 and the second stator electrode 8 of a high potential and by the attractive force between the movable electrodes 16, 18 and the segment electrodes 6A, 6B, even if the segment electrodes 6C, 6D are switched to a high voltage as shown in FIGS. 9C, 9D under the state that the segment electrodes 6A, 6B are held at the ground potential as shown in FIGS. 9A and 9B. Also, if the segment electrode 6A is switched to a high potential as shown in FIG. 9A and the stator electrode 8 is switched to the ground potential at time $t_{13}$, the movable section 14 is attracted again toward the stator electrode 8 by the repulsive force between the movable electrodes 16, 18 and the segment electrodes 6A, 6C, 6D and by the attractive force between the movable electrodes 16, 18 and the stator electrode 8. Further, if the movable electrodes 16, 18 are switched to a low potential at time $t_{14}$, the segment electrode 6B is switched to a high potential so as to cause the movable section 14 to be moved toward the segment electrodes 6B, 6C. By the repetition of the particular change of the potential, the movable section 14 is moved in the arranging direction of the plural segment electrodes 6A to 6D. To be more specific, the movable section 14 is shifted from the position facing the segment electrodes 6A, 6B to the position facing the segment electrodes 6B, 6C and further shifted from the position facing the segment electrodes 6B, 6C to the position facing the segment electrodes 6C, 6D. In this fashion, the movable section 14 is shifted in the arranging direction of the segment electrodes 6A to 6D.

If the shift mode is switched into a holding mode at time $t_n$, the segment electrodes 6A to 6D and the stator electrode 8 are switched into the ground potential, and the movable electrodes 16, 18 are switched from the high voltage into the floating potential. It follows that the movable section 14, which is kept charged, is maintained at the floating potential M so as to be held on the segment electrodes 6A, 6B, 6C, 6D or the stator electrode 8.

Incidentally, in the description given above, the movable electrodes 16, 18 are maintained at the floating potential. However, it is also possible to hold the movable section 14 without fail even if any one or all of the segment electrodes 6A to 6D and the stator electrode 8 are maintained at the floating potential.

As described above, the movable section 14 can be held without fail by any of the segment electrodes 6A to 6D and the stator electrode 8 by putting the segment electrodes 6A to 6D, the stator electrode 8 or the movable electrodes 16, 18 under the floating potential so as to set the holding mode.

The electrostatic actuator of the present invention described above can be utilized in various fields. For example, the electrostatic actuator can be used in the lens system or a photographing system of a photographing apparatus. Where the electrostatic actuator is mounted to a photographing apparatus, it is possible to mount a photographing lens to the movable section so as to form a focus mechanism. Also, a lens system capable of zooming can be formed by mounting a movable lens together with the movable section within a stationary lens system. Further, in an electrostatic actuator that is simply vibrated in the vertical direction, it is possible to mount a CCD for photographing to the movable section so as to realize a hand-vibration counteracting mechanism or to improve the resolution in a camera device in which the movable section is vibrated in the vertical direction in accordance with the external vibration. When the electrostatic actuator is maintained at the holding mode, the actuator can be held without fail with a small power consumption by utilizing the electrostatic actuator according to the embodiment of the present invention described above in the various fields of application described above. In addition, the power consumption of the system can be lowered.

As described above, the present invention provides an electrostatic actuator having a small power consumption and also provides a driving method of the particular electrostatic actuator.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrostatic actuator, comprising:
    a first substrate equipped with a first stator electrode and a first dielectric film covering the first stator electrode;
    a second substrate equipped with a second stator electrode and a second dielectric film covering the second stator electrode, the second stator electrode being positioned to face the first stator electrode;
    a movable part having first and second surfaces that are positioned to face the first and second stator electrodes, respectively, the movable part being provided with first and second movable electrodes formed on the first and second surfaces of the movable part, respectively; and
    a driving circuit including a switching circuit which selectively sets one of
        a moving mode in which first and second moving modes are alternatively switched to move the movable part between the first and second substrates and
        first and second holding modes in which the movable part is held on the first and second substrates, respectively,
    wherein the switching circuit is so switched as to
    apply a first potential to each of the first movable electrode and the second stator electrode and also apply a second potential differing from the first potential to the first stator electrode during the first moving mode in which the movable part is moved toward the first substrate,
    apply the first potential to each of the second movable electrode and the first stator electrode and also apply the second potential to the second stator electrode during the second moving mode in which the movable part is moved toward the second substrate, keep one or both of the first stator electrode, and the first movable electrode in an electrical floating state during the first holding mode in which the movable part is kept attached to the first substrate, and intermittently apply the first potential to the first movable electrode and apply the second potential to the first stator electrode to maintain the first holding mode, and keep one or both of the second stator electrode and the second movable electrode to be electrically floated in an electrical floating state during the second holding mode in which the movable part is kept attached to one of the first and second substrates, and intermittently apply the first potential to the second movable electrode and apply the second potential to the second stator electrode to maintain the second holding mode.

2. The electrostatic actuator according to claim 1, wherein the driving circuit sets one of the first and second moving modes and the first and second holding modes in accordance with a control signal.

3. The electrostatic actuator according to claim 1, wherein:
the movable part is arranged between the first substrate and the second substrate so as to be movable in a prescribed direction,
the second stator electrode is formed of a plurality of segment electrodes that are arranged on the second substrate in the prescribed direction, and
the driving circuit selectively applies first and second potentials to the segment electrodes during a shift mode in which the movable part is shifted in the prescribed direction.

4. A driving method for an electrostatic actuator including a first substrate equipped with a first stator electrode and a first dielectric film covering the first stator electrode, a second substrate equipped with a second stator electrode and a second dielectric film covering the second stator electrode, the second stator electrode being positioned to face the first stator electrode, and a movable part having first and second surfaces that are positioned to face the first and second stator electrodes, respectively, the movable part being provided with first and second movable electrodes formed on the first and second surfaces of the movable part, respectively, the driving method comprising:
setting a moving mode in which first and second moving modes are alternatively switched to move the movable part between the first and second substrates, wherein:
a first potential is applied to each of the first movable electrode and the second stator electrode and a second potential differing from the first potential is applied to the first stator electrode so as to move the movable part toward the first substrate in the first moving mode, and
the first potential is applied to each of the second movable electrode and the first stator electrode and the second potential is applied to the second stator electrode so as to move the movable
part toward the second substrate in the second moving mode; and
setting one of first and second holding modes in which the movable part is kept attached to the first and second substrate, respectively, the first holding mode being set when the movable part is contacted on the first substrate and the second holding mode being set when the movable part is contacted on the second substrate,
wherein:
one or both of the first stator electrode and the first movable electrode are kept in an electrical floating state during the first holding mode;
the first and second potentials are intermittently applied to the first movable electrode and to the first stator electrode, respectively, so as to maintain the first holding mode;
one or both of the second stator electrode and the second movable electrode are kept in an electrical floating state during the second holding mode; and
the first and second potentials are intermittently applied to the second movable electrode and to the second stator electrode, respectively, so as to maintain the second holding mode.

5. The driving method of the electrostatic actuator according to claim 4, wherein:
the movable part is arranged between the first substrate and the second substrate so as to be movable in a prescribed direction,
the second stator electrode is formed of a plurality of segment electrodes that are arranged on the second substrate in the prescribed direction, and
setting the moving mode includes selectively applyinh the first and second potentials to the segment electrodes so as to move the movable section in the prescribed direction.

6. An image pickup apparatus comprising:
a first substrate equipped with a first stator electrode and a first dielectric film covering the first stator electrode;
a second substrate equipped with a second stator electrode and a second dielectric film covering the second stator electrode, the second stator electrode being positioned to face the first stator electrode;
a movable part having first and second surfaces that are positioned to face the first and second stator electrodes, respectively, the movable part being provided with first and second movable electrodes formed on the first and second surfaces of the movable part, respectively; and
a driving circuit including a switching circuit which selectively sets one of
a moving mode in which first and second moving modes are alternatively switched to move the movable part between the first and second substrates and
first and second holding modes in which the movable part is held on the first and second substrates, respectively,
wherein
the switching circuit is so switched as to
apply a first potential to each of the first movable electrode and the second stator electrode and also apply a second potential differing from the first potential to the first stator electrode during the first moving mode in which the movable part is moved toward the first substrate,
apply the first potential to each of the second movable electrode and the first stator electrode and also apply the second potential to the second stator electrode during the second moving mode in which the movable part is moved toward the second substrate,
keep one or both of the first stator electrode and the first movable electrode in an electrical floating state during the first holding mode in which the movable part is kept attached to the first substrate, and intermittently apply the first potential to the first movable electrode and apply the second potential to the first stator electrode to maintain the first holding mode, and
keep one or both of the second stator electrode and the second movable electrode to be electrically floated in an electrical floating state during the second holding mode in which the movable part is kept attached to one of the first and second substrates, and intermittently apply the first potential to the second movable electrode and apply the second potential to the second stator electrode to maintain the second holding mode; and the image pickup apparatus further includes:
  a lens provided in the movable part to transfer an image of a subject and
  an image pickup device to detect the image of the subject transferred from the lens.

7. The image pickup apparatus according to claim 6, wherein the driving circuit sets one of the first and second moving modes and the first and second holding modes in accordance with a control signal.

8. The image pickup apparatus according to claim 6, wherein:
  the movable part is arranged between the first substrate and second substrates so as to be movable in a prescribed direction,
  the second stator electrode is formed of a plurality of segment electrodes that are arranged on the second substrate in the prescribed direction, and
  the driving circuit selectively applies first and second potentials to the segment electrodes during a shift mode in which the movable part is shifted in the prescribed direction.

* * * * *